Aug. 26, 1941.    P. R. HOLMAN    2,253,708
DETACHABLE WHEEL
Filed Jan. 9, 1941
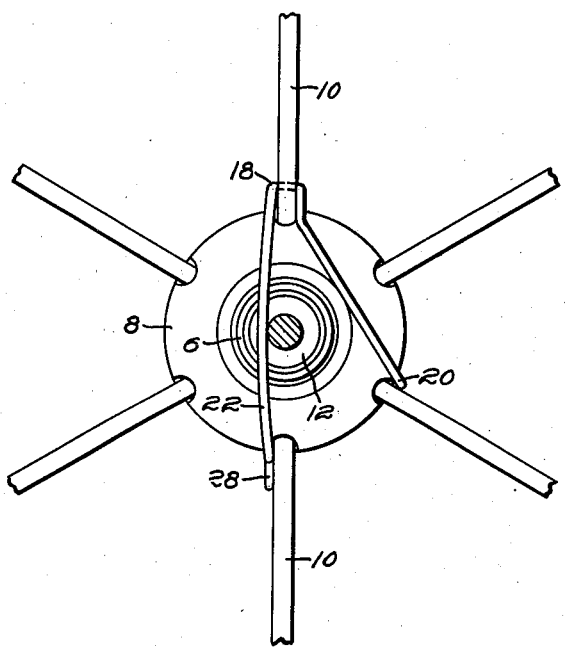
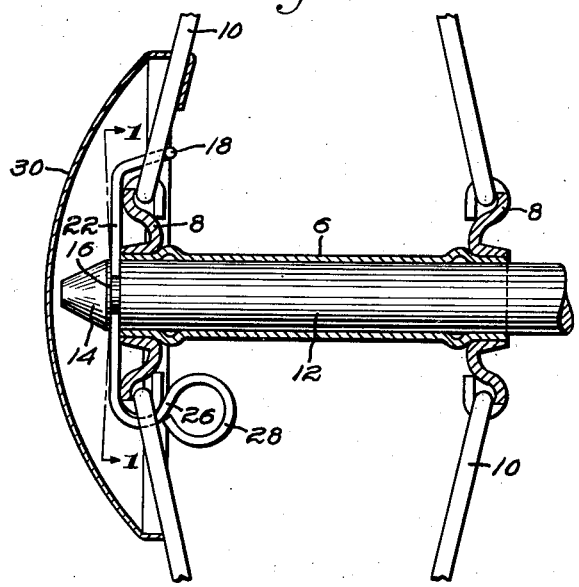
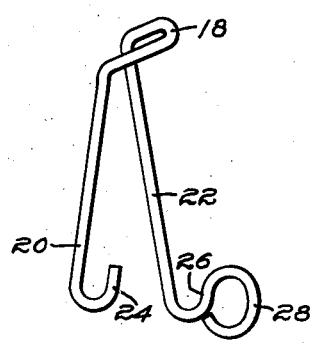
Inventor:
Paul R. Holman, Patented Aug. 26, 1941

2,253,708

UNITED STATES PATENT OFFICE 2,253,708

DETACHABLE WHEEL

Paul R. Holman, Leominster, Mass., assignor to F. A. Whitney Carriage Company, Leominster, Mass., a corporation of Massachusetts Application January 9, 1941, Serial No. 373,788

9 Claims. (Cl. 301—112)

This invention relates to detachable wheels, and the object is to provide a wheel having a clip acting in the manner of a linch pin to secure the wheel to the axle but permitting rapid mounting and demounting of the wheel without the use of tools.

My invention will be well understood by reference to the following description taken in connection with the accompanying drawing, wherein:

Fig. 1 is a front elevation of the central portion of a wheel embodying my invention, the cap shown in Fig. 2 being omitted and the end of the axle being sectioned on line I—I of Fig. 2;

Fig. 2 is a central vertical section; and

Fig. 3 is a perspective of the securing clip detached from the hub.

The provision in baby carriages and like light vehicles of wheels held to the axle by manually operable spring-pressed latches is not new. For instance, the device shown in the patent to Day 597,315, Jan. 11, 1898, has been extensively used. Such a construction is relatively expensive and occupies considerable space and thus in the smaller and cheaper vehicles, such as folding bag carts, so-called, and in children's wheeled goods generally, it has been customary to utilize a cotter through the outer end of the axle as a linch pin to secure the wheel. A cotter is somewhat inconvenient to withdraw and replace. When removed it is quite easily lost. If a cap is provided on the wheel to cover the end of the axle, it is necessary to remove the cap to get access to the cotter.

In accordance with my invention I provide a device almost as cheap and simple as the ordinary cotter, by the use of which the disadvantages referred to are obviated.

Referring to the drawing, I have there shown a wheel hub having an axle box 6 with annular end flanges 8 from which extend the spokes 10. The axle 12, which is received in the axle box 6, may be provided with a rounded or conoidal head 14 at the base of which is an abrupt retaining shoulder formed by the annular groove 16. I provide a catch at the outer end of the hub which, when received in this groove, will hold the wheel on the axle while permitting its rotation thereabout. This catch in the preferred form shown in the drawing is made from a single piece of spring wire of suitable gauge and has a U-shaped portion 18 adapted to fit around one of the spokes 10, the spoke in the twelve o'clock position in Figs. 1 and 2, the sides of the U lying across the periphery of the flange 8. From the ends of these sides diverging legs 20 and 22 extend across the face of the flange 8 and their ends may be rebent at 24 and 26 respectively to fit over the peripheral edge of the flange and rest against the relatively remote sides of the spokes in the six o'clock and four o'clock positions respectively, as shown in Fig. 1. As best seen in Fig. 1, the leg 22 in its normal position intersects the axle-receiving opening of the hub.

The clip may be formed as a unit, complete as shown in Fig. 3, and readily assembled with the hub in the manner shown in Fig. 1 on account of its yielding nature. When the axle 11 is introduced the body of the clip will be positioned by the spokes which are in the twelve and four o'clock positions respectively in Fig. 1, while the leg 22 may yield outwardly under the camming action of the tapered head 14, and when the shoulder of this head has passed, the leg will snap back into the groove 16, thus retaining the wheel on the axle but permitting the free rotation of the former.

To release the wheel, the leg 22 may be flexed outwardly beyond the shoulder of the head by manual manipulation. For this purpose the rebent end 26 may be formed into an enlarged eye portion 28 to be engaged by the finger, which portion, as seen in Fig. 2, will be disposed interiorly of the flange 8 but radially outward of the axle box 6.

A cap 30, preferably of relatively great diameter as regards the flange 8 of the hub and of domed form as shown, may be secured to the spokes as shown in Fig. 2 and the concavity thereof will define a chamber into which the end of the axle extends. The body of the clip is within this chamber and is concealed by the cap when viewed from the outer side (from the left in Fig. 2) as is also the finger piece 28. Nevertheless the finger piece is relatively accessible to release the grip of the clip or catch on the end of the hub without removal of the cap which may be attached to the wheel in a permanent manner prior to the assembly of the wheel with the axle.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. A detachable wheel comprising a spoked hub, a resilient wire having a middle portion looped around a spoke and legs extending therefrom terminally supported on other spokes, one of the legs normally intersecting the axle-receiving opening to engage an annular groove in the axle.

2. A detachable wheel comprising a hub having an annular flange and spokes rising therefrom, a clip looped around a spoke and having legs extending across a face of the flange and rebent over the edge of the same at relatively remote sides of other spokes, one of the legs normally intersecting the axle-receiving opening to engage an annular groove in an axle.

3. A detachable wheel comprising a hub having an annular flange and spokes rising therefrom, a clip looped around a spoke and having legs extending across a face of the flange and rebent over the edge of the same at relatively remote sides of other spokes, one of the legs normally intersecting the axle-receiving opening to engage an annular groove in an axle and having an enlarged portion at its end for moving the same outward to release the wheel.

4. A detachable wheel comprising a spoked hub, a wire clip having bent portions engaging spokes and positioning the clip in operative relation to the hub, the clip including a yielding leg normally intersecting the axle-receiving opening to engage an annular groove in an axle.

5. A detachable wheel comprising a hub having an annular flange and spokes rising therefrom, a clip fixedly mounted on said flange by outer portions engaging the periphery of the flange between the spokes and including an inner portion overlying a face of the flange, which portion is resiliently urged to a position intersecting the axle-receiving opening to engage an annular groove in an axle and is by manipulation displaceable from said position to release the axle.

6. A detachable wheel comprising a hub having an annular flange and spokes rising therefrom, a clip consisting of a bent length of resilient wire fixedly mounted on said flange by portions engaging the periphery thereof between the spokes and including a portion overlying a face of the flange, which portion is resiliently urged to a position intersecting the axle-receiving opening to engage an annular groove in an axle and is by manipulation displaceable from said position to release the axle.

7. A detachable wheel comprising a spoked hub, a domed cap overlying an end of the hub and secured to the spokes, a catch at the outer end of the hub received within the concavity of said cap and adapted to snap into engagement with an annularly shouldered head on an axle entered into the hub, the catch having a manipulating portion for releasing the engagement of said catch extending inwardly from the outer face of the hub and accessible at the inner side of the cap.

8. A detachable wheel comprising a spoked hub, a domed cap of relatively large diameter secured to the spokes the concavity thereof defining a chamber at the outer end of the hub, a releasable catch received in said chamber for engagement with an axle end extended thereinto, the catch having a manipulating portion for releasing the same extending past the periphery of the outer end of the hub and accessible at the inner side of the cap.

9. A spring linch pin comprising a U-shaped loop, a pair of diverging legs extending in a plane substantially perpendicular to the loop, the ends of the legs being rebent to that side of the main portions thereof where the loop lies and one having a finger piece extending on that side further from the plane of the legs than the base of the loop.

PAUL R. HOLMAN.